United States Patent [19]

Marsland et al.

[11] Patent Number: 4,686,630

[45] Date of Patent: Aug. 11, 1987

[54] LOAD MANAGEMENT CONTROL SYSTEM AND METHOD

[75] Inventors: Charles N. Marsland, Westborough, Mass.; Ralph J. Jannelli, Charlotte, N.C.

[73] Assignee: Process Systems, Inc., Charlotte, N.C.

[21] Appl. No.: 655,205

[22] Filed: Sep. 27, 1984

[51] Int. Cl.⁴ .......................... G06F 15/06; H02J 3/10
[52] U.S. Cl. .................................... 364/492; 364/483; 307/39
[58] Field of Search ................. 364/492, 493, 483; 307/35, 38, 39, 40, 41; 340/825.06, 825.18, 635

[56] References Cited

U.S. PATENT DOCUMENTS

| | | | |
|---|---|---|---|
| 3,359,551 | 12/1967 | Dennison | 307/39 |
| 4,204,127 | 5/1980 | Carter, II | 307/39 |
| 4,293,915 | 10/1981 | Carpenter et al. | 307/39 |
| 4,363,101 | 12/1982 | Czerniejewski | 307/39 |
| 4,396,844 | 8/1983 | Miller et al. | 307/40 |
| 4,419,665 | 12/1983 | Gurr et al. | 307/39 |

*Primary Examiner*—Parshotam S. Lall
*Attorney, Agent, or Firm*—Cushman, Darby & Cushman

[57] ABSTRACT

A load management control system and method which communicates load shedding information from a central station controller via existing telephone lines to a substation controller. The substation controller in turn controls the tap position selection of a load tap changing transformer to send encoded step voltage signals down a power distribution line to a load control receiver. The load control receiver decodes the encoded signal message and appropriately controls uniquely associated loads. The substation controller interrupts automatic operation of the voltage maintenance circuitry of the load tap changing transformer during transmission of a message. Control is returned to the automatic circuitry of the load tap changing transformer after the message is completed so as to make existence of the load management control system of the present invention transparent to existing equipment in the field. The method of the present invention maximizes utilization of existing lines of communication and existing power distribution field equipment while minimizing the effect on that same equipment.

22 Claims, 14 Drawing Figures

LOAD MANAGEMENT CONTROL SYSTEM AND METHOD

BACKGROUND OF THE INVENTION

The present invention relates in general to power distribution. More, specifically, the present invention provides a system and method for controlling power distribution to multiple loads. It provides individual control from a central location of widely dispersed loads whereby all necessary communications may be conducted over existing telephone lines and power distribution lines.

The desirability of load management is already recognized by utility companies. One of the general advantages of load management is conservation of resources while effectively meeting the existing demand for power. An important design constraint for a utility system is that it be able to meet peak load demand conditions. Load management concepts permit lowering of peak load demands without adversely affecting the overall "quality" of service. Since the supply of power necessary to meet demand is effectively lowered by load management techniques, resources both natural and capital may enjoy considerable savings.

While meeting power requirements, residential, commercial or any other type, with minimum necessary resources has distinct rewards, it is a goal not easily obtained. Load management techniques offer help in this regard, but application of any substantial changes in a macro-system such as a utility power distribution system generates numerous problems. A main problem is that a typical utility distribution system encompasses a myriad of widely dispersed individual loads and considerable distribution equipment. Accordingly, individual control of each such load potentially involves considerable communications and switching equipment and manpower requirements.

Communicating a decision to shed a particular load and executing that decision is the essential problem. Prior techniques have included radio transmission equipment to communicate load shedding decisions to the various relatively remotely located loads. This has numerous disadvantageous in that "dead spots" will naturally occur in a radio-link communications system as well as interference thereby rendering the system inoperative in certain areas. Additionally, that mode of communication does not lend itself to simultaneous individual control of numerous loads inasmuch as only a finite amount of bandwidth space is available for the respective radio communications, and this space would be rapidly consumed in assigning channels for the various loads.

Additionally, cost factors are of relative importance in a system where such large numbers of equipment might be necessary. That is to say, as complexity of a communication and switching system rises, the total cost of such of a system goes up sharply due to the large number of pieces of equipment necessary to accomplish all of the communicating and switching.

Other proposals to solve this large-scale communications problem have sought to transmit modulated information signals through existing power distribution lines. Again, the complexity and cost of the necessary transmitters and receivers have rendered such systems less than totally desirable for such large-scale operations.

Summary of the Invention

The present invention offers an integrated system solution for communicating from a central station to numerous individual loads to be controlled. Virtually all of the necessary communications may be handled over existing phone lines and existing power distribution lines. Thus, the invention is easily applied to existing power distribution systems.

In accordance with the present invention, a central station may communicate over existing telephone lines to a substation controller. The communicated information may include shedding information for particular loads at particular times, also including mode of operation such as one-shot time-out operation or duty cycle operation. Each substation controller is associated with particular voltage regulation equipment existing in the field. Such equipment may include voltage regulators or load tap changing (LTC) transformers. While any type of such equipment may be utilized with the present invention, an exemplary embodiment discussed in the present specification includes a load tap changing (LTC) transformer.

This LTC transformer is a conventional device widely used in many places in power distribution systems. Conventional LTC transformers have associated with them voltage maintenance circuitry which monitors the line voltage (as affected by current demand) and changes tap positions of the LTC transformer to keep the actual line voltage within predetermined ranges of a preselected voltage. Typical LTC transformers may have 16 or 32 tap positions, with each position being representative of some fractional portion of the rated voltage (e.g., say 90–110% of rated voltage). Thus, for example, a one position tap change (up or down) on a conventional 32 step LTC transformer would cause a $\frac{5}{8}\%$ line voltage change as compared with rated output voltage.

The substation controller of the present invention temporarily interrupts operation of the voltage maintenance circuit and takes over control of the LTC transformer to cause it to change taps in a desired coded sequence. Down line from the LTC transformer is a load control receiver (LCR) which detects and decodes the coded information included in the power distribution line voltage. The LCR in turn controls its associated loads as determined by the original information transmitted via telephone line from the central station to the substation controller.

Accordingly, existing power distribution lines of a utility company are utilized with the equipment of the present invention to create a totally integrated load management control system.

BRIEF DESCRIPTION OF THE DRAWINGS

These as well as other features and advantages of the present invention may be better understood by reading the following detailed description of the presently preferred exemplary embodiment and the accompanying drawings, in which.

DESCRIPTION OF THE PREFERRED EMBODIMENT

Figure 1:
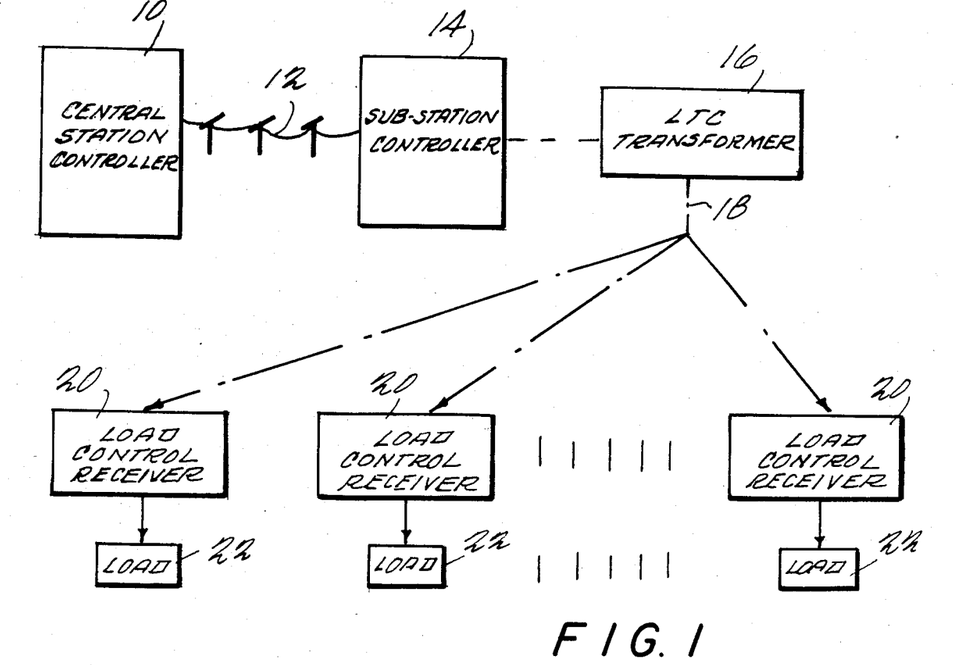
FIG. 1 is a comprehensive block diagram of the components of the present invention.

FIG. 1 represents the interrelationship of various components suitable for practicing the present invention. The central station controller 10 may communicate via existing telephone lines 12 to a substation controller 14. The substation controller 14 is located on site with a previously existing conventional load tap changing (LTC) transformer 16. The central station controller may be any suitable mainframe computer. In fact, its functions could be carried out by a computer already existing and handling other functions of the utility system to which this invention is applied. One example of a computer suitable for use as the central station controller is the Columbia Data Systems model 1510. The central station controller 10 and substation controller 14 communicate through well known modems, such as a Bell 103 or equivalent, with 300 baud asynchronous communications.

Any suitable communications protocol and method may be employed by a programmer of ordinary skill in the art for this telephone communications link. The minimum information which must be communicated from central station controller 10 to substation controller 14 includes which LTC transformer is to called and, at that LTC transformer, which "16-code" is to be addressed (to select a particular load to be changed). This will be explained further in detail below. Although much more information may be transferred in accordance with the present invention, this information is essential for the central station controller 10 to effectively shed desired loads.

A substation controller 14 is located at each LTC transformer 16 installation. The substation controller 14 is hardwired through the existing voltage maintenance device at the LTC transformer. This permits the substation controller 14 to interrupt the automatic operation of the existing voltage maintenance circuit and cause desired tap changing sequences. Operation of the substation controller with the LTC transformer will be discussed further below.

The LTC transformer 16 is controlled in a desired fashion to raise or lower its tap positions. A typical LTC transformer may have, for example, either 16 or 32 steps (taps). The particular embodiment described herein includes a 32 step (taps) transformer, although the present invention is readily adaptable to a 16 step transformer by one of ordinary skill in the art without undue modification. The LTC transformer may be of any suitable type. One highly suitable one, now on the market, is comprised of the Siemens-Allis type TLH-21 load tap changing transformer switch mechanism and its associated made-to-order windings. One of ordinary skill in the art readily recognizes that such an arrangement includes an associated voltage regulator.

The LTC transformer 16 is controlled, as per an example shown in FIG. 13 and further discussed below, to make small step voltage changes, i.e., amplitude modulation on power distribution lines 18. These amplitude modulations are established as digital coded signals constituting a message transmitted over existing power distribution lines to various load control receivers 20, each of which is uniquely associated with one of various loads 22 in the field. The coded signals transmitted over lines 18 are specifically established and disclosed by the present invention, and will be discussed in greater detail below.

The load control receivers (LCR) 20 monitor the voltage on power distribution lines 18 and decode the information transmitted by the substation controller 14 through its uniquely associated LTC transformer 16. When a particular LCR recognizes its "address", it acts to connect or disconnect its associated load 22. Each LCR has as its own address code previously strapped into its memory. Thus, whenever it "hears" its own "name" on the power line, it responds appropriately.

Various modes of load control can be carried out. For one mode of operation the disconnected load may be automatically reconnected after a predetermined time varying typically between 1 to 255 minutes (one-shot time-out operation). For another mode of operation, a duty cycle may be established wherein the load is automatically disconnected for a certain period of time out of a larger period of time, e.g., five minutes out of every hour. Other modes are possible within the spirit of the invention.

Additionally, the substation controller may issue through the coded signals a command under a group code, which would cause every receiver of that group to respond to subsequent commands, or it may issue instructions under a global or universal code to which all receivers may respond.

Figure 2:
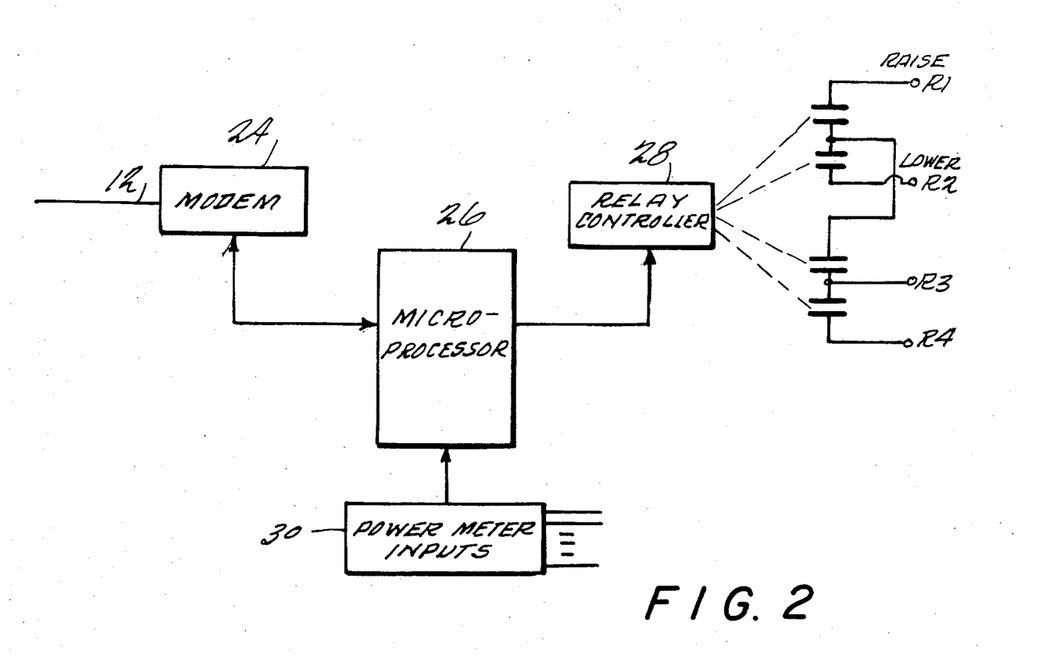
FIG. 2 is a block diagram of the substation controller of FIG. 1.

Referring now to FIG. 2, there is shown a more detailed block diagram of a substation controller 14. Telephone lines 12 (which may alternatively be microwave or leased communication channels) provide a secured transmission from the central station controller 10 to the substation controller 14. As shown in block diagram form, substation controller 14 utilizes a modem 24 (Bell 103 or equivalent) to communicate load shedding information from central station controller 10 to a microprocessor 26 of substation controller 14. Microprocessor 26 may be the widely used Z-80 microprocessor chip, or any other suitable chip which may be selected by the user of the present invention. The microprocessor 26 and central station controller 10 would be programmed readily by one of ordinary skill in the art to communicate the indicated necessary information between the two units. Microprocessor 26 would decode this information and suitably control a relay controller 28. Relay controller 28 is an interface device between microprocessor 26 of the substation controller 14 and relays R1–R4, which are informational outputs to LTC transformer 16 (explained further below). Power meter inputs 30 may also be fed to microprocessor 26 so that monitored information may be fed back over existing telephone line 12 to the central station controller 10 (i.e., remote power meter reading).

As is widely known, LTC transformers have their own electronic circuitry to automatically maintain the voltage output level of the LTC transformer at a desired point or within an acceptable range. This circuitry includes means for raising the tap by one, means for lowering the tap by one, and an "auto" means which may be interrupted and thereby prevent automatic operation of the LTC. In operation, substation controller 14 (using one of the relays such as relay R3) will interrupt the automatic operation of the LTC transformer 16, thereby permitting desirable control of the tap position settings. Relays R1 and R2 of substation controller 14 may then be used to effect raising or lowering of the tap position. It is presently preferred that R4 have an unassigned function to permit the ultimate user of the present invention to have a user-defined output.

The interrupt relay, R3 of substation controller 14, is necessary inasmuch as the LTC transformer would be changing taps sporadically as part of its normal operations to maintain its output voltage within the established range. If the LTC transformer were to continue its normal operation, and thereby undergo a change in its tap position while a signal was being transmitted by substation control 14 to a load control receiver 20, the coded signal would be distorted and either cause failure of the desired communication or a misreading of the communication thereby initiating undesirable load connecting or disconnecting. Operation of interrupt relay R3 prevents such miscommunication in the present invention. After the coded message is transmitted, control of the LTC transformer is returned to its respective voltage maintenance circuit after the tap position is returned to the place it occupied just prior to the interruption by relay 3 of normal tap changing operations.

Figure 3:
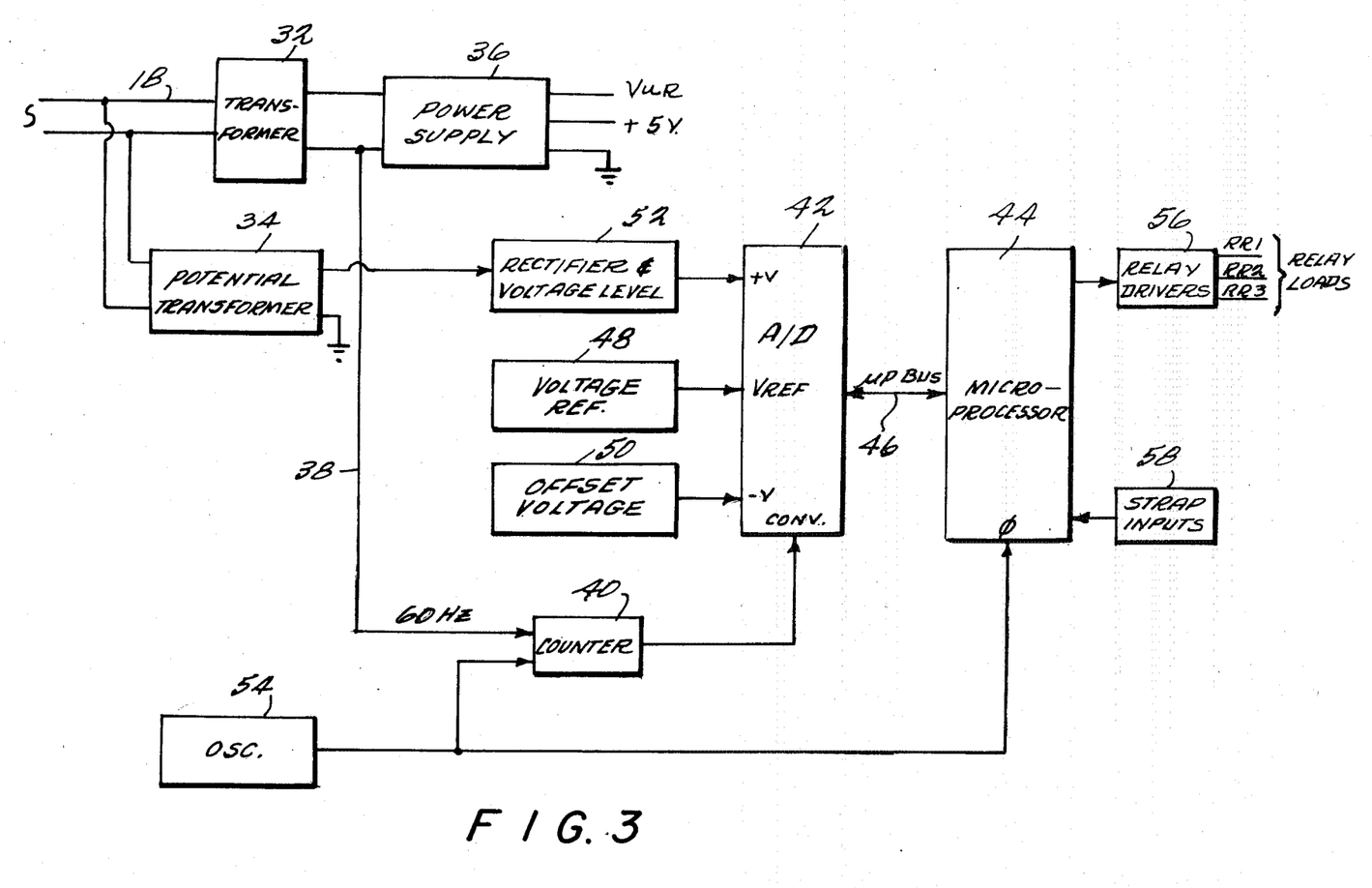
FIG. 3 is a block diagram of the load control receiver of FIG. 1.

FIG. 3 is a block diagram of an exemplary LCR 20 of FIG. 1. The AC power lines input to the LCR 20 are the same as shown by 18 on FIG. 1. This power distribution line 18 carries line voltage from the LTC transformer 16 to the LCR 20. This line voltage has on it the step voltage changes generated by tap changes of LTC transformer 16, whether they are automatic tap changes or part of an encoded signal. The LCR 20 distinguishes the nature of the step voltage line changes and detects and decodes any encoded signals which are present. The following describes this operation.

The LCR 20 of FIG. 3 is both an analog and digital device. Two transformers, 32 and 34, are used to establish necessary voltage levels for circuitry operation. Power supply 36 is the power supply for the digital circuitry of LCR 20. Its outputs include a positive voltage $V_{UR}$, positive five volt output and a terminal to ground. Power supply 36 input is provided by transformer 32, which also provides a 60 hertz input signal (the present invention being readily adapted to "European-type" 50 ltr. operation, as discussed below) via line 38 to counter 40.

Counter 40 in turn provides a clocking signal to analog to digital converter 42, which receives processed coded signal information from power distribution line 18 via rectifier and voltage level means 52, and converts it into a digital signal utilized as a data input for microprocessor 44 via bus 46. Voltage reference 48 and offset voltage 50 both are utilized in the analog to digital conversion process of A/D converter 42. A/D converter 42 obtains its data input from rectifier and voltage level circuit 52. The AC input to transformer 34 is rectified by circuit 52, and its voltage level reduced to a usable data input level for A/D converter 42. Oscillator 54 also provides clocking signals to microprocessor 44 and counter 40. Counter 40 is then used by A/D converter 42 as part of its sampling and digital converting technique.

Microprocessor 44 controls relay drivers 56, which suitably control the receiver relays 1-3 (RR1, RR2 and RR3) which ultimately control respective loads 1-3.

Strap inputs 58 are representative of strapped information loaded into microprocessor 44 to instruct the microprocessor what identification codes have been uniquely designated for the LCR 20 and its associated loads. This enables the central station controller 10 to uniquely address a specific LCR 20, thereby controlling any loads associated therewith. As will be discussed further below, the encoded signal transmitted via power distribution line 18 has at least four LCR select bits, which means that as many as 16 unique codes may be established. When the transmitted code matches the strapped code, a particular LCR "knows" that it is time to respond to load-shedding commands.

Figure 4A:
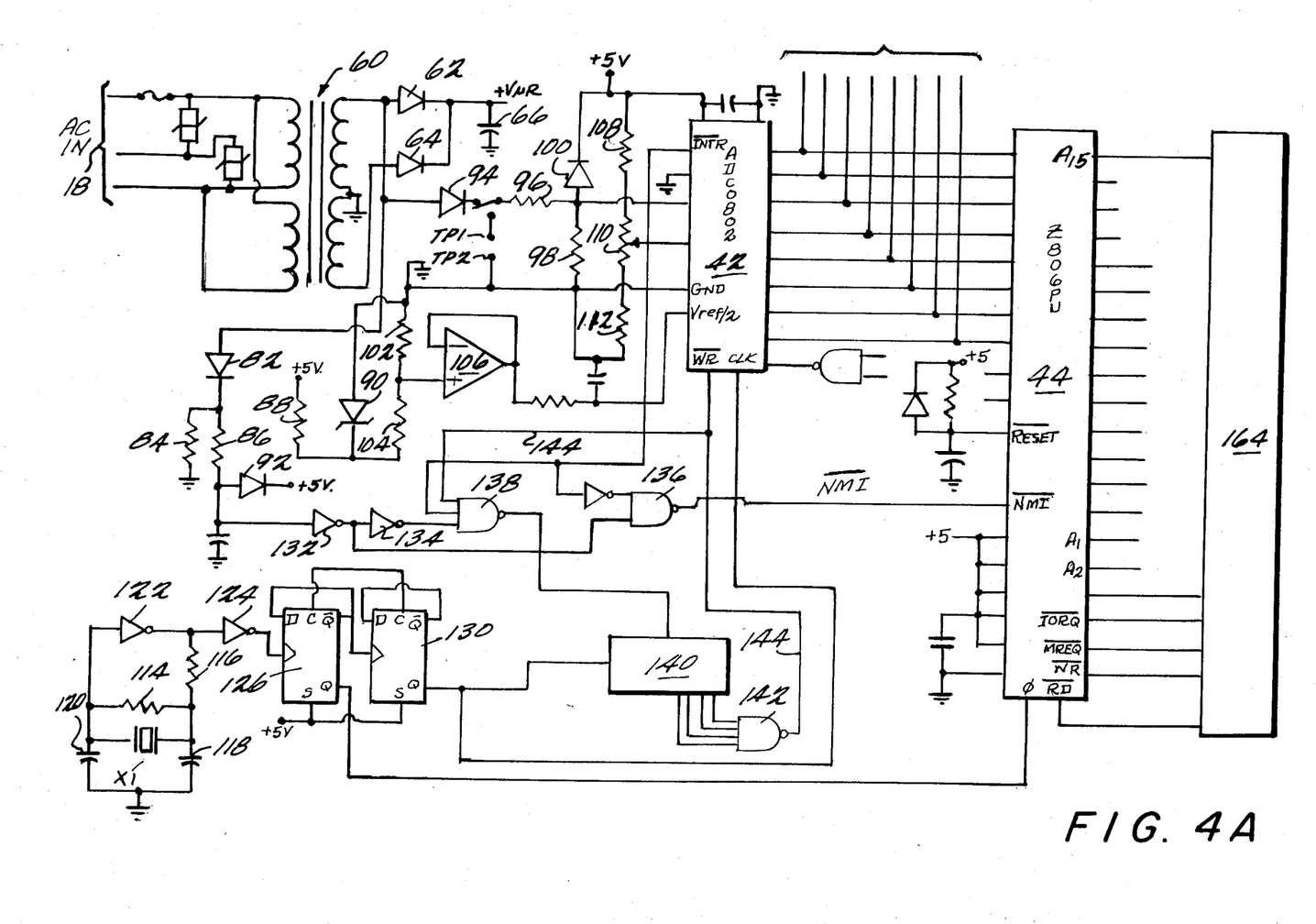
FIGS. 4A and 4B are circuit diagrams for the load control receiver of FIG. 1.
Figure 4B:
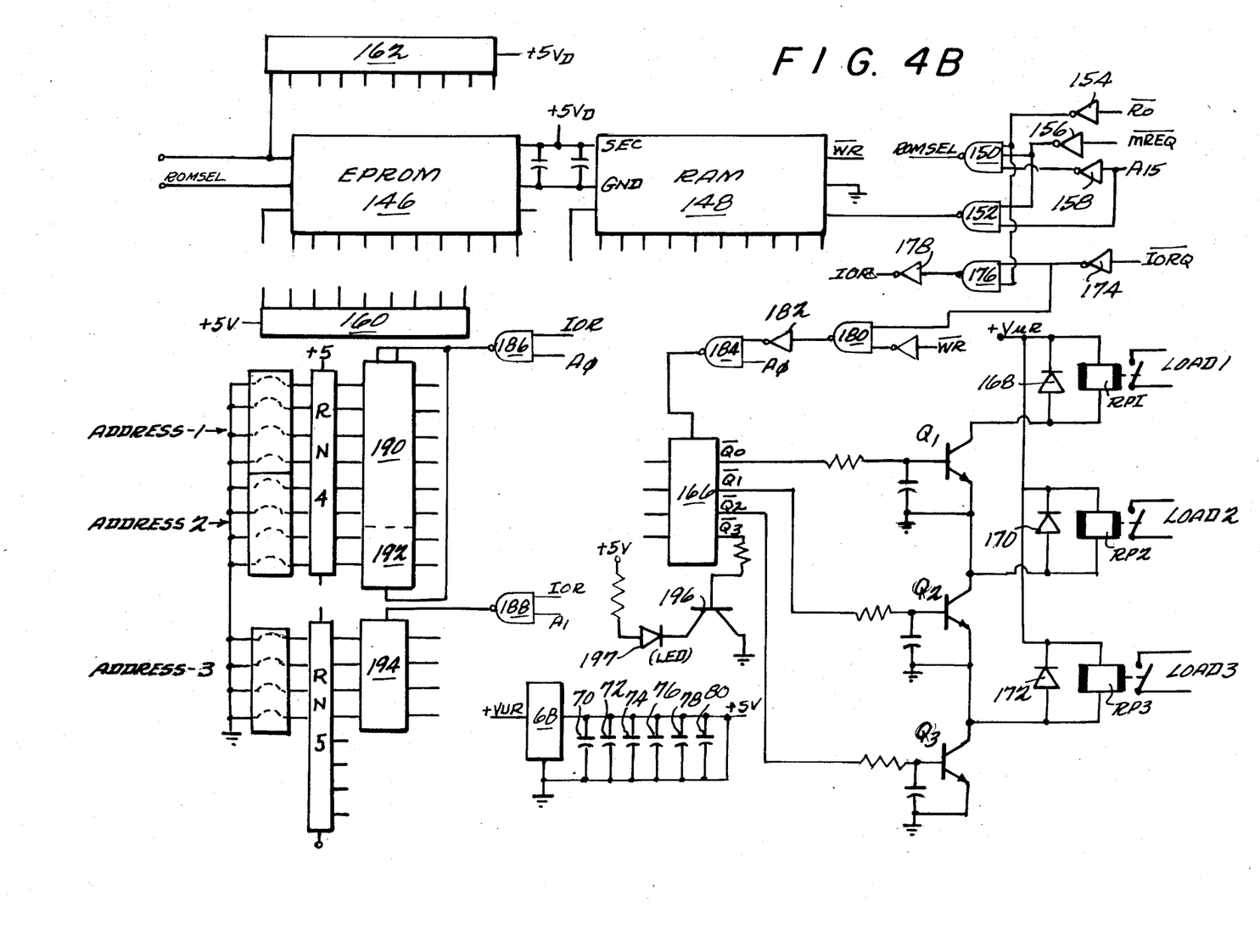

FIGS. 4A and 4B show the electronic circuitry for an exemplary LCR 20. Transformers 32 and 34 of FIG. 3 are shown as a single transformer 60 with power distribution lines 18 input thereto. Diodes 62 and 64 and capacitor 66 comprise power supply 36 of FIG. 3 to generate the positive voltage $V_{UR}$. Transformer 60 has two primary windings so it is capable of running on 115 or 230 volts AC. One secondary winding of transformer 60 is used for the positive 5 volt digital power supply. Positive $V_{UR}$ also is drawn from this winding of transformer 60 and it is used to supply power to the relay coils.

The full wave rectifier formed by diodes 62 and 64 rectifies the 12.6 volts RMS from the transformer secondary, and capacitor 66 filters this voltage. This voltage $+V_{UR}$ is input to regulator 68 (shown on FIG. 4B) which regulates this voltage down to 5 volts positive, thus establishing a power supply voltage for the digital circuitry. Capacitors 70-80 (also shown on FIG. 4B) are decoupling capacitors for the positive 5 volt power supply, and are distributed around the circuit to help reduce the effects of switching noise inherent to digital circuits. This 5 volts positive power supply for the circuitry shall be referred to as +5VD.

Secondary transformer winding 60, diode 82, resistor divider circuitry 84 and 86, and clamping diode 92 establish a pulse string with a repetition rate of 60 hertz. The positive edge of this 60 hertz repetition rate is inherently synchronized with the zero crossing of the AC line voltage from power distribution lines 18.

The data input to the A/D converter 42 also is taken from this secondary winding of transformer 60. Diode 94 rectifies the 12.6 volts from the secondary winding and resistor divider circuitry 96 and 98 reduces this voltage to a peak of 5 volts when the input line voltage on line 18 is at 132 volts RMS. Diode 100 clamps the voltage at +5VA to prevent the data input to A/D converter 42 from becoming more than positive 5 volts, thus preventing overload damage to converter 42.

Test points 1 and 2 (TP1 and TP2) permit signals to be injected to the data input of A/D converter 42 after disconnection of the input lines via a switch (not shown). One of the final four outputs of FIG. 4B, output Q3/196, is associated with an LED 197. A test feature is built directly into the LCR 20 of the present invention in that the test points may be injected with a signal which instructs the LED to be desirably switched, thus checking operation of the load control receiver.

Two reference voltages are required for the operation of the A/D converter 42. The first established reference voltage is the "range" (VREF/2). VREF/2 is established as follows. The +5VA is regulated down to 2.49 volts by resistor 88 and precision Zener diode 90. This produces a highly stable voltage reference. The 2.49 volts reference is further divided by resistor divider circuit 102 and 104. These resistors may be of 1% tolerance to maintain the highly stable reference voltage. Operational amplifier 106 is established as a voltage follower and acts to buffer the reference voltage VREF/2. From the output of operational amplifier 106, the reference voltage is fed to the VREF/2 input of the A/D converter 42.

The second reference voltage necessary for the A/D converter 42 is the "zero offset". This reference voltage is developed by a resistor divider network 108-112. The variable resistance of resistor 110 is set so that the A/D converter 42 reads zero counts on its output when an A/C line voltage on power distribution line 18 is equal to 90 volts RMS.

A/D converter 42 produces a binary signal on its 8 outputs which is proportional to the measured voltage at its input. Protection for low voltage circuits is maintained by the A/D converter 42 outputting a "0" value for a reading of 90 volts on the line. Thus, motor circuits which might be damaged by too low a voltage are protected by virture of the microprocessor 44 cutting off the load for A/D outputs of "0" after several seconds, and then trying to restore the load several seconds later. This conversion process by the A/D converter 42 starts when the voltage on input line $\overline{WR}$ makes a low to high transition. The timing of this transition is described further below. A crystal controlled oscillator comprised of resistors 114 and 116, crystal X1, capacitors 118 and 120 and gate 122 produces a pulse train of 2.4576 Mhz. Gate 124 buffers this output train into divider 126 which divides the input by two. The Q output of 126 drives the clock input $\phi$ of microprocessor 44. The pulse train from divider 126 is further divided by two by divider 130. The pulse train produced by divider 130 has a frequency of 614.4 khz.

The 60 hertz pulse train (described above) is input to Schmidt trigger/inverter 132 and then 134. This particular signal is fed through gate 136 to provide a non-maskable interrupt ($\overline{NMI}$) signal to microprocessor 44. When reset, gate 138 prevents counter 140 from counting. When the output of gate 138 goes high, counter 140 will begin counting the pulse train input to it from divider 140 (i.e., 614.4 Khz.)

The outputs of counter 140 are decoded by gate 142 to create a logic "zero" pulse beginning just prior to the peak of the 60 Hz. sine wave. The positive edge of this counter 140 pulse resets gate 138 via line 144 thereby resetting the counter 140, and gate 142 returns to logic "1".

This positive edge of the gate 142 signal will also cause A/D converter 42 to begin its conversion process (i.e., convert data input from analog to digital on its eight output lines D1-D8. This conversion process is undertaken near the peak of the 60 Hz. sine wave. The voltage change on the input of the A/D converter 42 during the conversion time is small enough so as not to contribute to more than one half of a bit change in the A/D converter 42 count. The $\overline{INTR}$ flag goes to "0" at the end of the A/D conversion signal, thus through an inverter enabling gate 136 to generate $\overline{NMI}$.

The specific circuitry of A/D converter 42 and its input counter system removes the typical requirement for a "sample and hold" circuit common in most A/D measurement techniques. At the end of the conversion, the digital output signal established by A/D converter 42 is held in the converter 42 until the next start signal is received. The microprocessor 44 reads the digital output of A/D converter 42 whenever it receives a non-maskable interrupt ($\overline{NMI}$) signal from gate 136. This occurs, as described above, at the end of the A/D conversion. When the microprocessor 44 reads the A/D data the $\overline{INTR}$ signal from the A/D converter returns to logic "one" thereby re-enabling gate 138 for the next cycle.

The memory for microprocessor 44 may consist of EPROM 146 (ROM) and RAM 148. The EPROM device 146 contains the instructional sequences for the microprocessor 44 while the RAM device 148 contains data. These features are shown on FIG. 4B.

Integrated circuits 150, 152, 154, 156 and 158 decode the processor address and control line thereby selecting one of the two memory devices as required by the program. Resistive networks 160, 162 and 164 merely provide resistor networks to enable "pull-up" for the data and address buses.

The load control outputs of the load control receiver 20 is comprised of gate 166, transistors Q1-Q3 and their associated circuitry, diodes 168-172 and receiver relays RR1, RR2 and RR3, each with their respective loads 1-3. Microprocessor 44, in accordance with its stored program, decides what action to take with regard to selecting relay positions for the various loads in accordance with input data fed from A/D converter 42 via power distribution lines 18. Microprocessor 44 sends this information to the four-bit latch 166. The individual relay driver circuits are then opened or closed by latch 166 to cause its uniquely associated load to be energized or deenergized.

The remaining integrated circuits permit input/output decoding, i.e., permit the microprocessor 44 to read or write to the I/O devices. These include gates 174, 176, 178, 180, 182, 184, 186 and 188. That is to say that these integrated circuits are utilized in a known fashion to enable the I/O devices to write to latch 166 or to read from address inputs 190, 192 or 194.

Operation of LED 197, and its associated circuitry of $\overline{Q3}/196$ from latch 166, was described above with regard to the test feature of the present invention and TP 1 and 2 (test points). If the circuitry is not performing a test, the LED still performs an indicating function in that it blinks at a predetermined rate while LCR 20 is receiving an encoded signal message from LTC transformer 16 and blinks at half that rate while no encoded signal is being detected by LCR 20. Accordingly, this $Q_3$ output could be used in conjunction with test points 1 and 2 to determine whether an injected signal correctly selected the particular output of latch 166 which is associated with LED 197 or to indicate whether an encoded signal is presently being detected. This fully integrated test feature thereby establishes self-contained within the load control receiver 20 means to permit remote testing at a field location without the need to involve an actual line voltage modulation by LTC 16 or switching of a load 22 or means to monitor signal detection.

Figure 8:
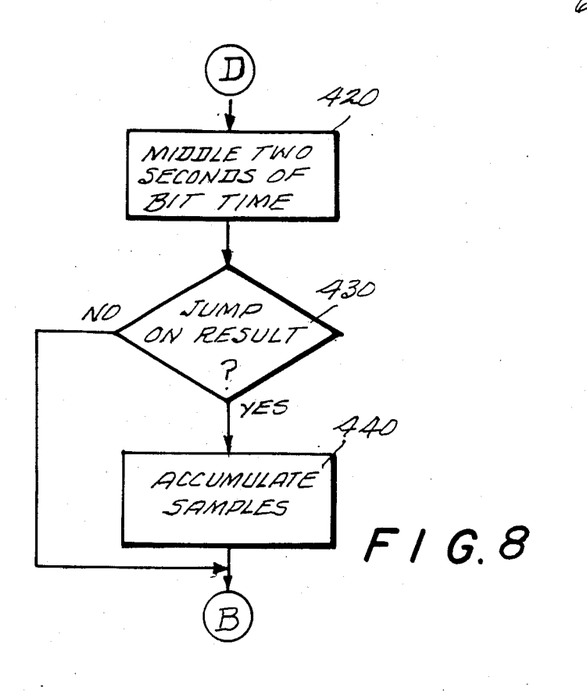
Figure 9:
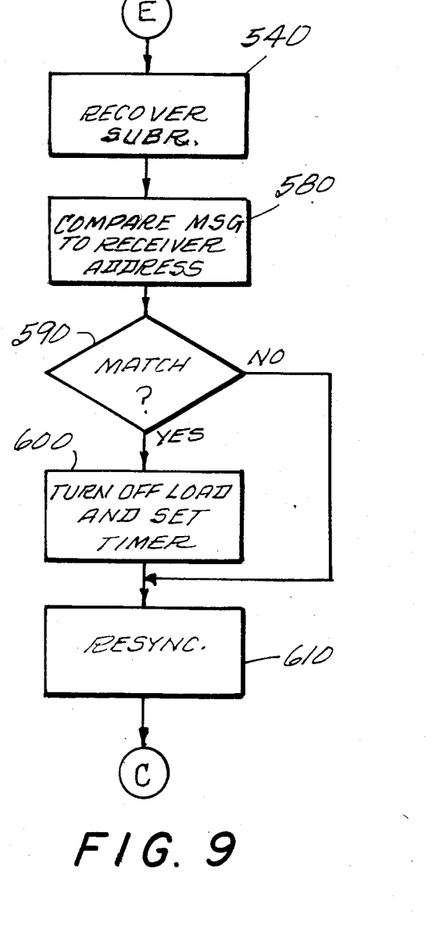
Figure 10:
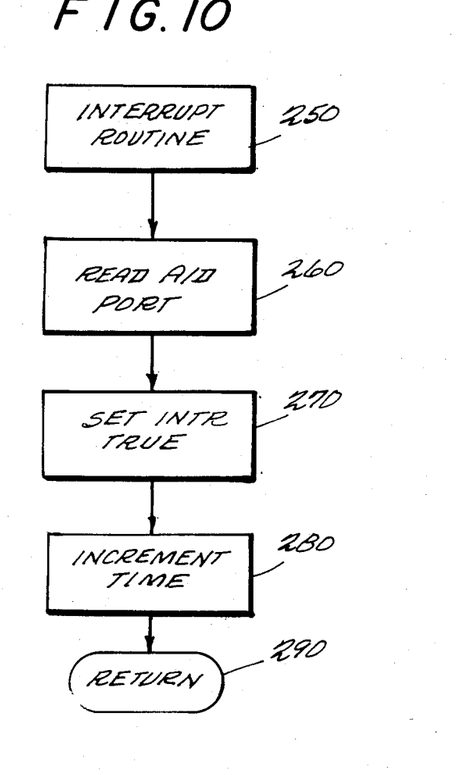
Figure 11:
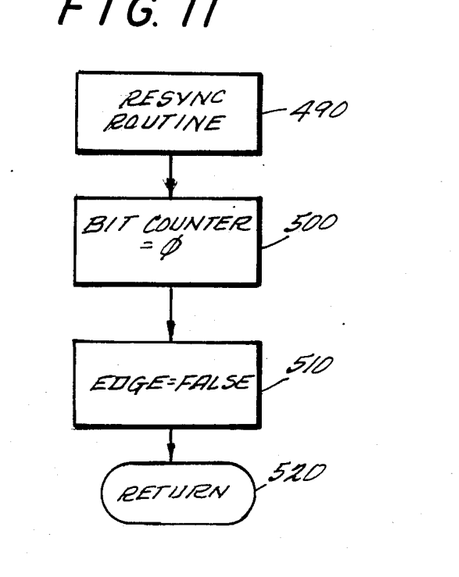
Figure 12:
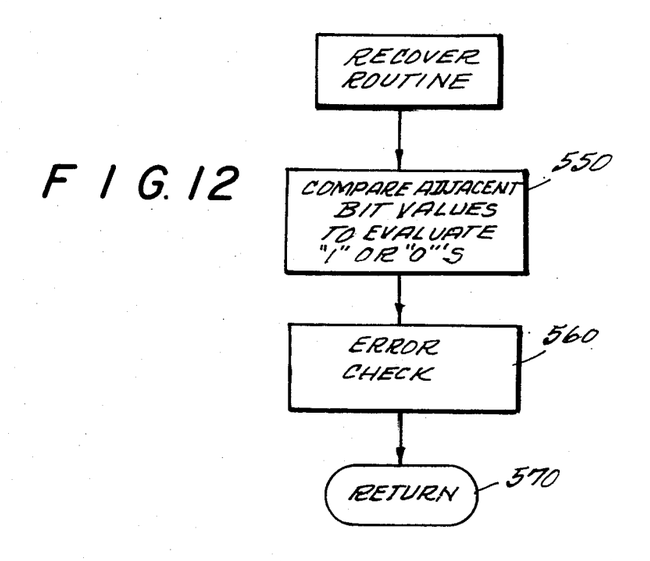

The operation of the load control receiver 20 may be better understood by examining the flow charts of FIGS. 5 through 12. FIGS. 5 through 9 disclose the overall operation flow chart of an LCR 20. FIGS. 10 through 12 are subroutines associated with the flow chart of FIGS. 5 through 9; FIG. 10 is an INTERRUPT routine, FIG. 11 is a RESYNC routine and FIG. 12 is a RECOVER routine.

The microprocessor 44 of FIG. 4 may be, for example, a Z80 CPU which can be readily programmed by one of ordinary skill in the art in conjunction with the flow charts of FIGS. 5 through 12 as accompanied by the following description.

Figure 5:
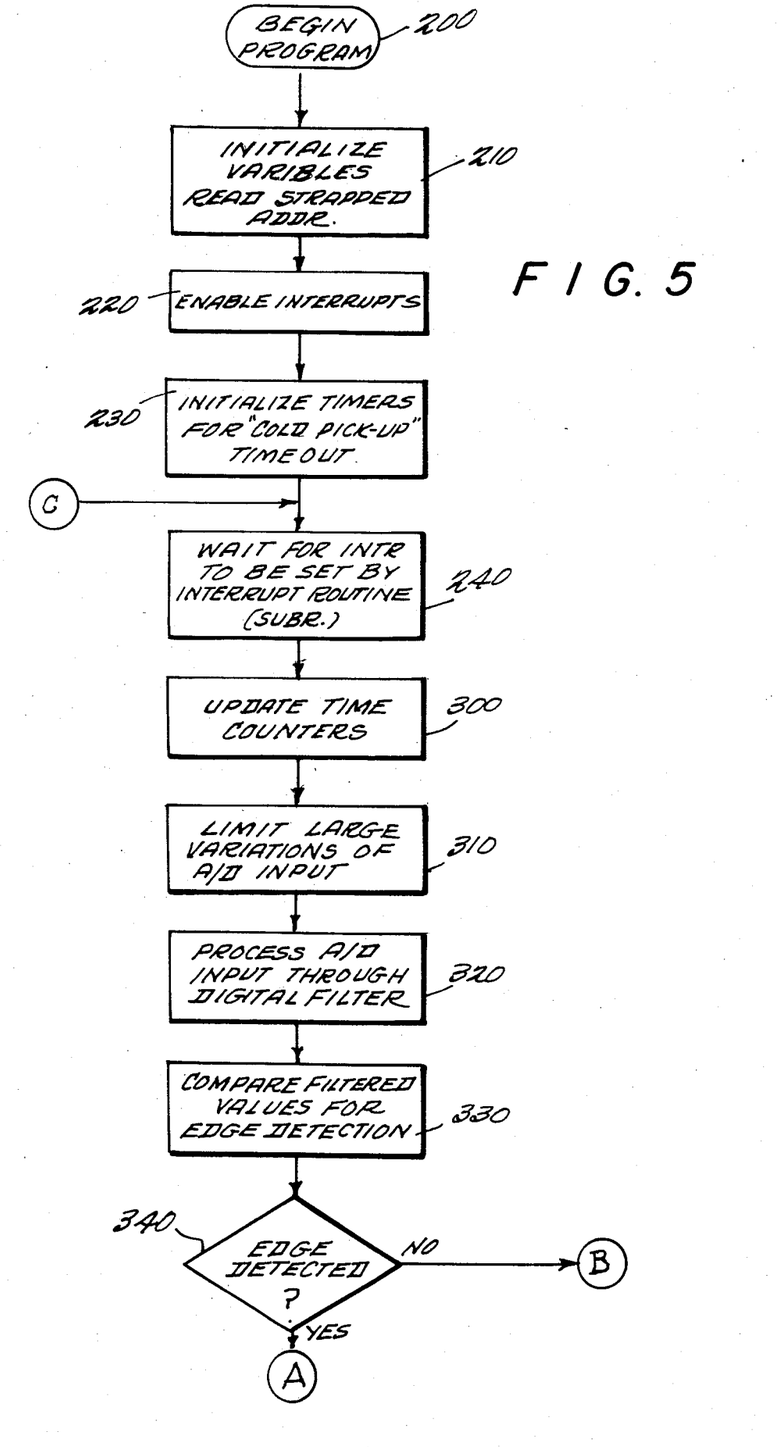
FIGS. 5 through 12 are flow charts for the operation of the load control receiver of FIG. 1.

Referring to FIG. 5, the program of the microprocessor 44 begins at step 200. In step 210, certain variables associated with each unique placement of the present invention in an actual physical environment are initialized, and certain strapped information is read into the microprocessor. This strapped information may include the unique address assigned to a specific or a given LCR unit 20 in a realization of the present invention. In step 220, the interrupts of the microprocessor are enabled to permit subsequent reading of data from the A/D converter 42 into the data input of microprocessor 44.

In step 230, the timers associated with the various circuitry of FIGS. 4A and 4B are initialized for "cold pick-up" after there has been a shutdown of the device. This step amounts to reading the output of the A/D converter 42 after restart to obtain a random timeout of some range, possibly on the order of but not limited to between 1 to 4 minutes. This helps to scatter the return of loads to a line after a power outage, thereby easing the overall restart of a power distribution system. After this randomly generated timeout is accomplished, the INTERRUPT sequence is established by the INTERRUPT subroutine, as shown in step 240. The INTERRUPT subroutine is listed in FIG. 10. The INTERRUPT subroutine begins at step 250 with a subsequent reading of the data output of A/D converter 42 in step 260. The microprocessor in step 270 sets the interrupt to true, i.e., indicates that data has been read in, and associated timing functions of microprocessor 44 are incremented in step 280. The INTERRUPT subroutine then returns in step 290 to the main program at step 300.

An update occurs in 300 to update the minutes and seconds counters (possibly embodied in software) based on the incremental time counter as returned from the interupt routine. At this point in the main program, the data from A/D converter 42 has been read into or processed by the microprocessor 44. The microprocessor and its programming also comprises clipping filtering indicated in step 310 as limiting large variations in the input from A/D converter 42. This function effectively reduces non-meaningful information, and prepares the data for subsequent processing.

This subsequent processing begins in step 320, which includes at least digital filtering performed by a digital filter algorithm wherein a "weighted low pass" filter in software performs as an "adaptive" filter. The weighting factor of the weighted filter is one of the variables which is introduced into microprocessor 44 by step 210 by the reading of the strapped information.

After this degree of processing on the input data, the flow chart of FIG. 5 is ready to reach its first decision branch in steps 330 and 340. The function of the load control receiver 20 is to receive data and suitably control respective loads in response thereto. Accordingly, the microprocessor (after processing the input data) must make a threshold determination of whether an "edge" has been detected. That is to say, the LCR 20 must decide whether a signal is being sent. What constitutes a signal and the coding schemes relative thereto will be discussed further below in conjunction with FIG. 13. It may be understood at this point in the discussion that edge detection may involve, for example, a two step tap position change on a 32 step LTC transformer wherein the tap changes are both in a reducing direction and occur a short time apart, for example four seconds.

If the substation controller 14 has interrupted the normal operation of an LTC transformer 16 and generated a two step reduction only four seconds apart, this will be recognized as an edge detection in step 340 of the flow chart FIG. 5. The voltage maintenance circuitry of the existing LTC transformer has an automatic time delay with regard to successive tap position changes which is variable between 15 and 120 seconds with regard to successive tap position changes. Accordingly, the existing circuitry can not permit two tap changes within four seconds of one another. Therefore, the existing automatic control circuitry of an LTC transformer can not mimic the "edge detect" signal utilized in the present invention.

Furthermore, switching first in the downward direction in the coding scheme provides maximum "headroom" for subsequent bits inasmuch as heavy load conditions would cause the tap position on an LTC transformer to be moving up. Accordingly, at a time when load shedding is most likely to be desired (i.e., heavy load or anticipated heavy load conditions), the LTC transformer will likely be stepped in an upward direction with regard to its tap positions. Accordingly, utilizing a specific coding scheme which begins with downward movement for two steps provides the maximum likelihood of a successful signal transmission.

Figure 7:
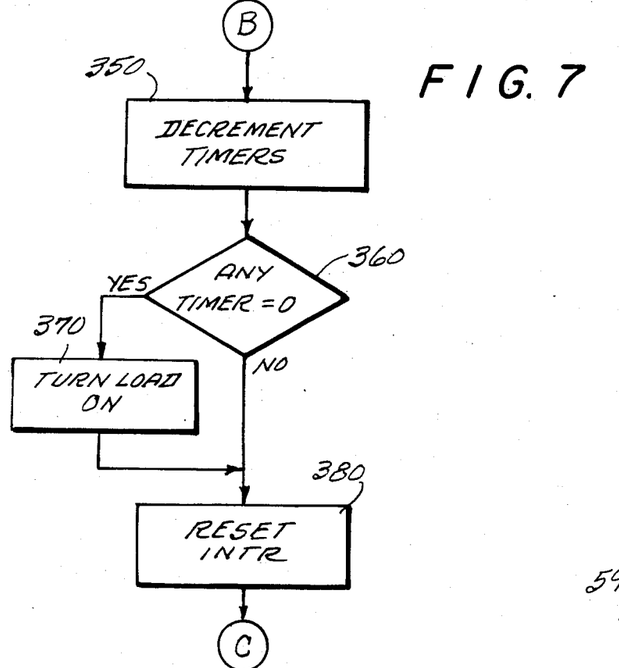

If the edge detection step 340 of FIG. 5 is negative, the flow chart branches to point B in FIG. 7. In the event that loads associated with the presently discussed LCR device 20 have been already turned off, an internal timer of microprocessor 44 will be operating. This timer is updated (i.e., decremented by a real-time amount) at this point in the program. If one of the timers for one of the loads has reached a count of zero (i.e., step 360), the program branches along step 370 to turn that load back on. If no timer has reached zero, the program continues along branch 380 to reset the interrupt (i.e., gain new data input from A/D converter 42) and return at point C in the main flow chart of FIG. 5. This reset, interrupt and return branch of FIG. 7 is also followed after any appropriate loads are turned back on in step 370.

Returning to the flow chart of FIG. 5, steps 240-340 will again be carried out as previously described using the data from A/D converter 42.

Reaching again the decision step 340 for edge detection, assume that this time an edge is detected in accordance with the present invention. Then the main flow chart of FIG. 5 is carried along branch A to step 390 of FIG. 6. Step 390 involves start up of a bit timer which is associated with the actual reading of a coded message from the substation controller 14 and its associated transformer LTC 16. A/D converter 42 is continuously sampling the input voltage received from transformer 60, in accordance with the oscillator and counter functions previously described with regard to FIGS. 4A and 4B.

Figure 13:
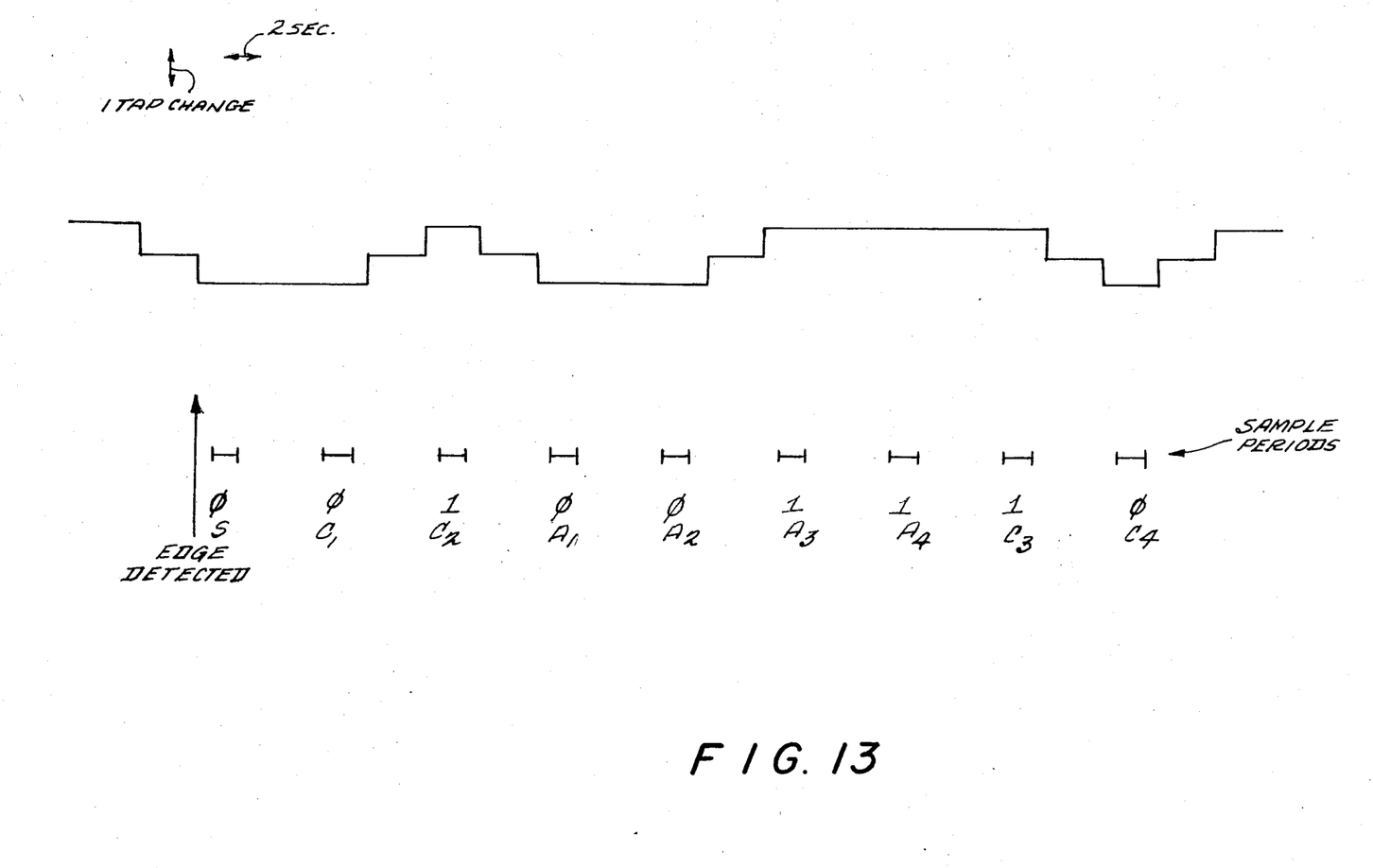
FIG. 13 is an example of the coding scheme disclosed by the present invention to communicate between the substation controller and the load control receiver via the load tap changing transformer.

As can be seen from FIG. 13, bit information is measured over a defined period of, for example two seconds, by the timer utilized in step 390. The operation of FIGS. 4A and B as discussed above indicated that a 60 hertz clocking signal for measuring of input data was derived from the transformer 60. That is to say that sixty samples per second will be taken by the A/D converter 42. If a total of two seconds is defined as a single bit by step 390 of FIG. 6, a total of 120 samples for each bit will be obtained. Branching junction 400 of FIG. 6 indicates that whenever the bit time is completed (that is to say that all 120 samples have been obtained) a bit value is determined in step 410 in the flow chart of FIG. 6 based on the average of the 120 samples. Assuming that branch D is taken after step 400

(i.e., the end of the bit sample time has not been obtained), the branch of FIG. 8 is followed.

Steps 420-440 of FIG. 8 readily explain a simple reiterative process which causes 120 samples to be accumulated. After these samples are accumulated, branch B is followed through FIG. 7 to indicate that a new sample is ready to be obtained. That is to say that an interrupt from the microprocessor is defined to indicate the appropriate moment to obtain a new data input.

Figure 6:
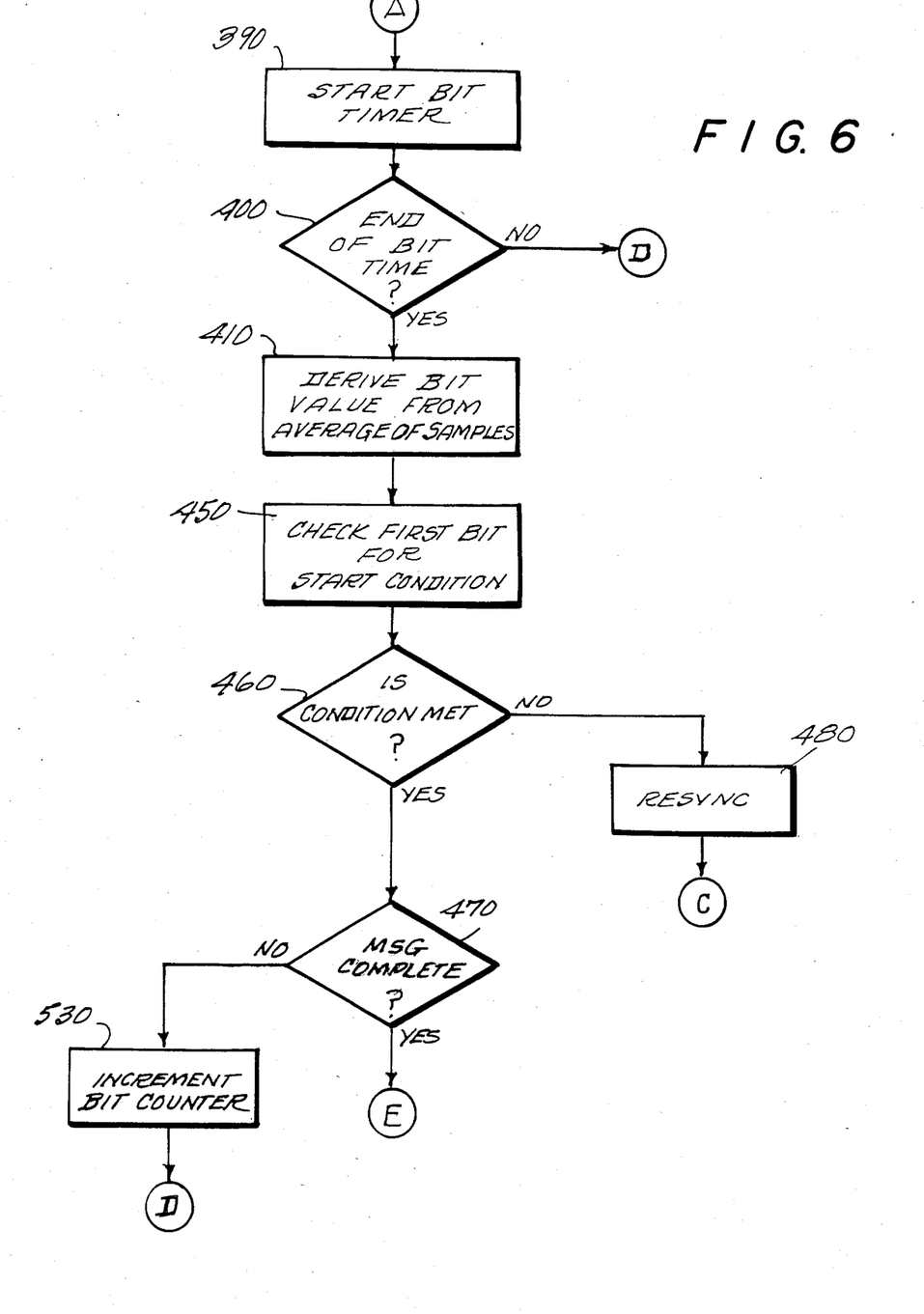

Should an affirmative result be obtained from the decision junction 400 of FIG. 6, the value for that bit is derived from the average of samples as previously discussed. In step 450, the first bit of the coding scheme, defined as a start bit, is checked by the program to see whether a proper start bit is present. It may be noted from FIG. 13 that the start bit is initiated by definition precisely one second after the edge detection has occurred.

If it has been determined in decision junction 460 that a start bit is present, a decision loop 470 is entered to determine whether the message is complete, i.e., contains all bits of the multi-bit encoded signal. If the decision branch point 460 determines that a proper start bit has not been received, a RESYNC branch 480 is taken. RESYNC branch 480 is actually a RESYNC subroutine indicated in FIG. 11 by steps 490-520.

Referring to FIG. 11, in the RESYNC subroutine the bit counter is first set equal to zero. This is in accordance with the fact that no valid start bit has been received, and therefore no message has yet begun. The edge detection is reset equal to false in step 510 so that the load control receiver 20 may begin to look for a new edge detection signal. After this point, the RESYNC subroutine returns control to point C of FIG. 6. Point C is a designated reentry point which returns control to the first flow chart of FIG. 5. Control then begins with Step 240 as previously discussed.

If the start bit present decision in step 460 of FIG. 6 was positive, the message complete decision branch 470 is entered. Branch 530 will be taken if it is determined by the Q microprocessor 44 that the message is not yet complete. The bit counter is then incremented and control is given over to branch D of FIG. 8 so that new samples are accumulated with control returned to FIG. 7 and subsequently FIG. 5 as previously discussed.

If the message is complete in accordance with step 470 of FIG. 6, branch E will be followed to FIG. 9. The first step 540 of FIG. 9 involves an additional subroutine called RECOVER. This subroutine is listed in FIG. 12, and begins its function by comparing adjacent bit values to determine whether, relative to one another, they constitute a digital "one" or "zero". In actuality, the program of microprocessor 44 compares a present bit with a previous bit to determine its relative value. The start bit is a defined bit "zero", and the program works from there to determine the relative values of all subsequent bits. This permits the encoded message to be maintained relatively insensitive to background line voltage changes. After step 550 is completed to determine the relative value of all bits, error check step 560 is undertaken, as will be discussed further with regard to coding scheme example set forth in FIG. 13.

A coding step 560 operates to strip the start bit and four Hamming code check bits, which check the remaining bits for individual bit errors from the multi-bit encoded signal message. The remaining message bits comprise an Expansion bit and four Relay address bits $A_1$ through $A_4$. The Expansion bit may be used for any defined function, such as mode selection to determine whether the load control receiver will operate to deenergize its respective loads in a duty cycle or for a one-shot time-out. Relay address bits $A_1$ through $A_4$ provide up to 16 unique relay addresses. This information tells the load control receiver 20 whether it is being addressed with regard to load-shedding operation for its specific uniquely associated loads, as discussed with regard to FIGS. 4A and 4B.

After the error check and subsequent stripping of noninformational bits to recover address information from the encoded message has been accomplished in FIG. 12, step 570 returns control from the RECOVER subroutine to step 580 of FIG. 9. The decoded message (i.e., the EXPANSION bit and four address bits) is compared to the strapped information in microprocessor 44 regarding respective receiver addresses. In step 590, the microprocessor 44 undergoes a decisional process to determine whether a match of those two addresses is present. If the match determination is positive, branch 600 is taken and the appropriate relay is energized to thereby turn off a respective load and set a timer if appropriate. This timer is the same as was discussed with regard to FIG. 7 and step 360 concerning a time-out timer for previously deenergized loads.

If the match decision step 590 yields a negative result, the turn off load step 600 is omitted. Whether the decision from match step 590 is positive or negative, the RESYNC subroutine will be followed in step 610 after any appropriate loads have been turned off in step 600. The RESYNC subroutine, listed in FIG. 11, prepares the load control receiver 20 to receive the next message by setting the bit counter to zero and edge detector equal to false, as was previously discussed. Following the RESYNC subroutine of 610 of FIG. 9, control is returned through branch C to the main flow chart of FIG. 5.

The foregoing discussion fully describes all possible branches and decision loops of flow charts 5 through 12 which describe the operation of load control receiver 20. A programmer of ordinary skill in the art would readily be able to work with the flow charts of FIGS. 5 through 12 and the hardware shown and described with regard to FIGS. 4A and 4B to program microprocessor 44 to perform the above-described functions. This is particularly true when taken in conjunction with the following description of FIG. 13 as it pertains to a coding scheme example of the coded communication between substation controller 14 and load control receiver 20 via LTC transformer 16 across existing power distribution lines 18.

The multi-bit coding scheme utilized in the communication link between substation controller 14 and load control receiver 20 is established as shown in the following table.

TABLE 1

| S | $C_1$ | $C_2$ | E | $A_1$ | $A_2$ | $A_3$ | $A_4$ | $C_3$ | $C_4$ |
|---|---|---|---|---|---|---|---|---|---|

S = start
C1 = check bit 1
C2 = check bit 2
E = expansion bit
A1 = relay address bit 1
A2 = relay address bit 2
A3 = relay address bit 3
A4 = relay address bit 4
C3 = check bit 3
C4 = check bit 4

The start bit begins by definition one second after a leading edge of an encoded signal message is detected by microprocessor 44. As stated earlier, maximum "headroom" for operation of the present communication link is established by beginning an encoded message with two tap position change reductions. This is clearly shown in the coding scheme example of FIG. 13, which will be further discussed. The low point established at the edge detection is defined as a beginning "zero". Bit values may be sampled over a period of two seconds each. This sample time is a variable which may be modified for different real-world installations. This makes the present invention adaptable to different conventional LTC transformers owing to their varying inherent minimum switching times. If the minimum switch time of the LTC transformer is four seconds, then a coding scheme example as shown in FIG. 13 may be set forth.

It should be carefully noted that the expansion bit indicated in Table 1 is not included in the coding scheme example of FIG. 13. The expansion bit is a user definable bit which permits further specific operation of the load control receiver 20, such as mode selection between duty cycle control or one-shot time-out control of the switched loads. The start bit S is a definitional bit for establishing the low signal (i.e., "0") value for subsequent repetitive relational measurement and determination of the bit values. As was described with regard to the flow chart operation of load control receiver 20, each subsequent bit is respectively compared with the previous bit to establish a relative relational value for a digital "1" or "0". The start bit is the initial value for a defined "0". Such a method permits this communication link to be insensitive to background system line voltage changes. Additionally, the step line voltage changes introduced by the tap changes are always averaged to equal to zero change so as to minimize the net effect of tap switching (i.e., message sending) on the power distribution system.

Check bits 1 through 4 constitute utilization of a well known Hamming code which checks for individual bit errors in the remaining bits of the message. See step 560 of FIG. 12 of the RECOVER subroutine.

Relay address bits $A_1$ through $A_4$ enable designation of up to 16 unique addresses. The decoded address is operated on as appropriate by the load control receiver 20 to energize or deenergize related relay drivers, thereby having the same effect on their uniquely associated loads.

If the above coding scheme is utilized on a 32 step load tap changing transformer, then two steps are necessary between defined values of "0" and "1" to have sufficient minimum voltage differences for accurate detection by a load control receiver. A 32 step transformer controls output voltage over a 20% range in ⅝% steps. Also, as may be seen from the coding scheme example of FIG. 13, the LTC transformer 16 is always returned at the conclusion of a message to its original position as established prior to the sending of a message.

Thus, the apparatus of the present invention is transparent to an existing LTC transformer installation. The coding scheme example shown in FIG. 13 utilizes a total length of time of approximately 80 seconds to transmit a message. The operation of the substation controller 14 will be such that the automatic operation of an LTC transformer 16 is interrupted during that message transmission sequence. However, the LTC transformer 16 is permitted to operate independent of the present invention during all other times. Also, whatever encoded signals are sent via the LTC transformer 16, the automatic voltage maintenance control circuitry of the LTC transformer 16 will be utilized to actually command the raising or lowering of tap changing positions. This is important inasmuch as the voltage maintenance control circuitry for an existing LTC transformer has a mechanical counter which is incremented each time a tap position is changed. This counter is utilized in evaluating maintenance needs for individual LTC transformers. Thus, the present invention will still permit the automatic maintenance counter of an existing LTC transformer to be incremented with each tap change, leaving maintenance determinations unaffected.

It should be noted that inasmuch as the substation controller is a "smart" device (i.e., possessing its own microprocessor), transmission of messages from the central station controller 10 to substation controller 14 may be limited to only several times a day if desired or necessary. Information for a day's load management controlling could be stored in the microprocessor of substation controller 14 and acted on throughout the day in accordance with a real-time clock.

Such program storing could also be embodied in the load control receiver 20 itself inasmuch as it also contains the requisite processing and memory means.

Numerous other variations and modifications may be envisioned by those skilled in the art with regard to the exemplary embodiment previously set forth and described in detail. All such variations and modifications may be made without departing from the advantageous and novel features of the present invention, and are therefore intended to be included within the scope of the claim coverage.

An example of such modification could include expansion of the transformer 60 of FIG. 4A to two transformers 32 and 34 as shown with regard to FIG. 3. These two smaller transformers would help prevent signal "sag" whenever the relays are switched on.

A further embodiment of the present invention could include switching "up" initially in a given coding scheme instead of the downward direction disclosed for the present embodiment. Such a switching sequence could indicate a different type or mode of control to the load control receiver.

A further modification might include use of a 16 step LTC transformer in place of the 32 step transformer described. A one step change in a 16 step LTC transformer is a larger percentage voltage change than that of a one step change in a 32 step LTC transformer. Therefore, only one step would be required to produce the requisite voltage change necessary for the load control receiver 20 to clearly recognize such change. This would permit the potential message transmission time to be cut in half inasmuch as only one tap change would be necessary for each bit. Furthermore, as stated earlier, "tap time" (i.e., the time to change one tap position) does vary with particular LTC transformers, and such variation may be included in one of the strapping variables or tabled variables of the present invention. Thus, the present invention is fully adaptable to a wide range of existing conventional LTC transformers. This makes the overall system a ready retrofit to most utility power systems without the need for the existing system to "bend" to the present invention.

Variables may be loaded into the various components of the present invention in either table form in various memories or strapped in as a unique feature of a specific device, e.g., a unique address designation. The tap time, voltage threshold for switching and the number of steps per bit are all values which may be established in "lookup" tables. The unique address code for each load control receiver is a variable which is strapped into each LCR unit 20. The time-out for a particular LCR 20 may be either in a table or strapped. This would permit potentially separate time-outs for both one-shot or duty cycle operation. The duty cycle operation or one-shot operation is a functional selection which may be executed through the expansion bit, as discussed above.

If operation with a fifty cycle power distribution system (instead of a sixty cycle system) is necessary, the load control receiver could be modified by plugging in a new oscillator in place of X1 with a different crystal frequency, and making minor software changes to accommodate the counter and timing systems which are dependent on the system frequency.

The degree of flexibility of the present invention is further demonstrated by the nature of the system itself. The system contemplates interconnecting communications links of multiple "smart" devices over existing phone lines and power distribution lines. This enables an effective communications network to be established whereby information to be acted on later may be actually communicated at selected and desired times. For example, if an operator of the central station controller 10 desires to shed loads at a particular substation later in the day, this information could be transmitted earlier in a day by the central station controller to the substation controller. This information, stored at substation controller 14, could be displayed or flagged in a certain fashion so that potential field users might know in advance of proposed load shedding. Furthermore, inasmuch as the load control receivers themselves constitute "smart" devices, decision to select dutycycle mode of operation or one-shot time-out operation may also be sent in advance to these devices. Then, the user located at the load itself might be able to have advance knowledge of pending load-shedding decisions.

While currently only one-way communication is envisioned from the substation controller 14 to a load control receiver 20 via the LTC transformer 16, the substation controller 14 has ready return communication to central station controller 10. Accordingly, aggregate load-shedding monitoring could take place at substation controller 14 and such information communicated back to central station controller 10. Thus, a relatively interactive load management control system is envisioned from the viewpoint of the user of the central station controller 10.

In addition to the wide range in flexibility of the present invention, a further advantageous feature includes the ready adaptability to existing communication networks and actual power distribution field equipment. The actual installation of the load control receiver itself may be greatly facilitated by a circular plug-in module which would fit under a circular power meter. Such a mounting device would be a through-plug with regard to the power meter portion, and a parallel connection to the power line input to enable the load control receiver 20 to obtain power and signals from power distribution lines 18 as shown in FIG. 3.

These, and all other modifications and variations within the scope of one of ordinary skill in the art are intended to be included in the scope of the following claims.

What is claimed is:

1. A power distribution system including load tap changing transformers and associated conventional voltage maintenance circuits, comprising:
    substation controller means, associated with each load tap changing transformer, for responding to overide and control signals input thereto to override normal tap changing operation of said voltage maintenance circuits, and for subsequently and selectively controlling the tap position of said tap changing transformer to produce step changes in the line voltage output of said tap changing transformer to thereby produce an encoded message;
    central station controller means for inputting said override and control signals to said substation controller means; and,
    a plurality of load control receiver means for monitoring said step line voltage changes caused by said load tap changing transformer and, in response to said encoded message, selectively interrupting power to loads which are uniquely associated with each of said plurality of receiver means.

2. The system of claim 1, wherein: said encoded signal is a digitally encoded multi-bit signal generated by said step line voltage changes for causing specific load control receiver means to interrupt power to their uniquely associated loads.

3. The system of claim 2, wherein:
    said load control receiver means comprises:
    voltage sensing and averaging means for producing time-sampled data indicative of the line voltage;
    edge-detection means responsive to said produced data for distinguishing a leading edge of said encoded message from the normal tap changing operation of said voltage maintenance circuit; and
    decoder means, responsive to said leading edge for sensing the encoded message, assigning relative high/low values to each bit of said encoded message, decoding the encoded message to determine whether it applies to the associated load control receiver means, and generating power interrupt signals as appropriate.

4. The system of claim 3, wherein:
    said digitally encoded signals are encoded in accordance with a specific coding scheme established in microprocessor and memory means in said substation controller means and said load control receiver means; and
    said microprocessor and memory means of said load control receiver means contains strapped variables unique to each load control receiver means so as to permit said substation controller means to uniquely address and command each of said plurality of load control receiver means.

5. The syste of claim 4, wherein: said coding scheme includes a global code to which all load control receiver means are responsive in interrupting power to their associated loads.

6. The system of claim 4, wherein:
    said decoder means establishes relative bit values by consecutively comparing a present bit to the most recent previous bit, with an initial bit having an assigned value of zero, whereby the relative consecutive determination of bit values makes the encoded message relatively insensitive to background line voltage changes; and
    said coding scheme has an average message value held close to zero so as to have minimum affect on existing line voltage.

7. The system of claim 3, wherein:
said load control receiver means further includes driver means for interrupting power to said loads in accordance with a predetermined pattern.

8. The system of claim 7, wherein:
said predetermined pattern is designated as either automatic duty cycle operation or one-shot time-out operation, and designation of said predetermined pattern is included in said encoded message monitored by said load control receiver means.

9. The system of claim 8, wherein:
said predetermined pattern is individually determined for each of said plurality of load control receiver means so that specific loads may be interrupted for a specific time interval or operated on a selected duty cycle.

10. In combinsation, a telecommunications and power distribution network, comprising:
a plurality of two-way telecommunications links established respectively between a central station controller and a plurality of substation controllers;
a plurality of load tap changing transformers, each of which is uniquely associated with a respective one of said substation controllers; and
a plurality of load control receivers associated with a power distribution line of a given load tap changing transformer, each load control receiver having a plurality of loads uniquely associated therewith; wherein:
load-shedding information is originated by the central station controller, transmitted via said telecommunications links to selected substation controllers, impressed in a coding scheme on respective power distribution lines by said substation controller by causing tap position changes specified in said load-shedding information to occur in said transformers so as to generate an encoded signal over the power distribution line, said encoded signal being decoded and executed by said load control receivers so as to shed loads designated by said load-shedding information.

11. A network as in claim 10, wherein:
power meter readings are transmitted from said substation controllers via said telecommunications links to said central station controller so as to provide remote aggregate load sensing.

12. A method of controlling loads through a power distribution system, comprising the steps of:
selectively controlling the tap position of a tap changing transformer to generate step line voltage changes in said tap changing transformer output to thereby produce a multi-bit digitally encoded signal impressed on the line voltage;
monitoring the line voltage and decoding said encoded signal; and
selectively deenergizing specific loads in accordance with said encoded signals.

13. A method as claim 12, wherein:
a receiver is associated with loads for monitoring said line voltage and for performing said decoding and deenergizing steps;
a substation controller is associated with each tap changing transformer for performing said tap position control step; and
a central station controller is located relatively remotely from said substation controller for instructing the performance of said substation controller.

14. A method as in claim 12, wherein:
said selectively controlling step includes interrupting the normal tap changing operation of said tap changing transformer and subsequently controlling said tap position in accordance with a predetermined digital communication scheme.

15. A method as in claim 14, wherein:
said selectively controlling step includes, after completing generation of said signal, returning the tap position of said tap changing transformer to the position it held just prior to interruption of normal tap changing operation.

16. A method as in claim 12, wherein:
said monitoring and decoding step includes distinguishing between tap position changes constituting said encoded signals and tap position changes which occur during normal tap changing operations of said tap changing transformer.

17. A method as in claim 16, wherein:
said distinguishing step includes indicating the leading edge of one of said digitally encoded signals by switching tap positions twice in the same direction in a shorter period of time than normal operation of the tap changing transformer could accomplish.

18. A method as in claim 17, wherein:
said same direction tap position changes generate two successive step voltage drops in said line voltage so as to provide maximum switching room for subsequent portions of said signal.

19. A method as in claim 18, wherein:
said two step voltage drops establish a voltage which is assigned an initial bit value of "zero" and all subsequent bits are consecutively compared to the most recent previous bit for relative establishment of a "zero" or "one" bit value;
said encoded signal has an average multi-bit value close to "zero" relative to line voltage displacement so as to minimize effects on said line voltage; and
upon conclusion of said selective control step, said tap position is returned to its position held just prior to interruption of said normal tap changing operation.

20. A method of controlling loads by selectively positioning the tap position of a tap changing transformer, comprising the steps of:
interrupting the normal tap changing operation of voltage maintenance circuitry associated with said tap changing transformer;
selectively raising and lowering said tap position to generate step voltage changes in the line voltage produced by said transformer, wherein said step voltage changes constitute a multi-bit encoded message;
monitoring said line voltage and distinguishing between normal tap changing operations and tap changes which constitute said encoded message;
when said message is present, receiving and decoding said message to obtain load control information contained therein; and
controlling said loads in accordance with the load control information.

21. A method as in claim 20, wherein:
said multi-bit encoded message has an average value of "zero" relative to said line voltage so as to minimize the effect of the message on said line; and
said interrupting step further includes returning to normal tap changing operation of asid voltage maintenance circuitry after completion of the selectively raising and lowering step.

22. A method as in claim 20, wherein:
said decoding step includes establishing an initial bit as a "zero" bit value, and subsequently and consecutively determining bit values of said encoded message relative to the next previous bit value, whereby said encoded message is maintained relatively insensitive to background line voltage changes.

* * * * *